US005820319A

United States Patent [19]

Hull et al.

[11] Patent Number: 5,820,319

[45] Date of Patent: Oct. 13, 1998

[54] AUGER BIT HAVING A REPLACEABLE TIP

[76] Inventors: Harold L. Hull, 401 Canyon Way #43, Sparks, Nev. 89434; Wilbur H. Akley, 1215 Montello, Reno, Nev. 89512

[21] Appl. No.: 586,001

[22] Filed: Jan. 16, 1996

[51] Int. Cl.[6] ...................................................... B23B 51/00

[52] U.S. Cl. ............................................ 408/214; 408/230

[58] Field of Search .................................... 408/214, 213, 408/201, 199, 200, 230, 229

[56] References Cited

U.S. PATENT DOCUMENTS

| | | | |
|---|---|---|---|
| 21,179 | 8/1858 | Barnes | 408/213 |
| 166,378 | 8/1875 | Higgins | 408/213 |
| 716,557 | 12/1902 | Klingensmith | 408/214 |
| 778,845 | 1/1905 | Cox | 408/214 |
| 877,831 | 1/1908 | Creedon . | |
| 1,389,578 | 9/1921 | Charlton | 408/213 |
| 2,883,888 | 4/1959 | Stewart | 408/214 X |
| 3,426,860 | 2/1969 | Peterson | 175/392 |
| 3,687,565 | 8/1972 | Byers et al. | 408/214 X |
| 4,625,593 | 12/1986 | Schmotzer | 408/214 X |
| 5,092,719 | 3/1992 | Zsiger | 408/213 |
| 5,143,163 | 9/1992 | Stiffler et al. | 175/385 |
| 5,244,319 | 9/1993 | Cochran | 408/211 |

FOREIGN PATENT DOCUMENTS

| | | | |
|---|---|---|---|
| 197809 | 9/1978 | Germany | 408/214 |

*Primary Examiner*—Daniel W. Howell
*Assistant Examiner*—Henry W. H. Tsai

[57] ABSTRACT

The present invention is substantially a spiral type auger bit having a first end which is removably attachable to an auger tool and a second end which is of a shape and size to removably receive a replaceable tapered screw type biting tip therein.

1 Claim, 1 Drawing Sheet

AUGER BIT HAVING A REPLACEABLE TIP

FIELD OF THE INVENTION

The present invention is substantially related to spiral type bits but more particularly relates to a spiral type auger bit having a first end which is removably attachable to an auger tool and a second end which is of a shape and size to removably receive a replaceable tip therein.

BACKGROUND OF THE INVENTION

Many aspects of the building construction industry involve installation of various means for providing services such as wiring plumbing, and pipe fitting. These various installations, as well as others, involve attaching or routing such means through the structural components of a building. In this trade, it is well known to use various sized spiral type auger bits, with each being used for various purposes.

The typical auger bit (such as taught within U.S. Pat. Nos. 5,244,319 and 877,831) has a tool engaging portion at one end and a head portion containing an integrally formed drill tip on the second end. Unfortunately, these bits are very costly and must be replaced often due to the fact that the drill tips wear out, even though the actual integrally formed bit and shank portions remain functional. Again, this practice of continually buying a new bit when the drill tip wears out, can be extremely costly for the workman who incurs such cost. It is therefore contended by the applicants, that if the workman could simply replace the worn out drill tip with a new one rather than replace the entire bit, this would be highly advantageous for the workman and save them considerable costs.

Within the prior art, replaceable drill tips have been taught, such as U.S. Pat. No. 4,950,108 teaches a drill for metal working comprising a drill body and a replaceable tip. This reference is functional for its intended use, but due to the design of the fastener means which retains the replaceable tip, it could not be used to replace the drill tip of an auger bit.

OBJECTS, SUMMARY AND ADVANTAGES OF THE PRESENT INVENTION

It is therefore contended by the applicants that a need exists for an auger bit which allows the workman to replace the biting tip thereof, when the tip has become worn.

It is therefore an object of the present invention to provide substantially a spiral type auger bit having a tool engaging portion at one end, and the second end thereof being of a shape and size to removably receive a replaceable tapered screw type biting tip therein.

It is a further object of the present invention is to provide a spiral type auger bit which includes means to removably retain therein various types of biting tips of choice, with each having a specific design and purpose.

Still a further object of the present invention is to provide a spiral type auger bit which may be sold and manufactured as a complete kit, having the above noted replaceable tips therewith.

Yet another object of the present invention is to provide a spiral type auger bit having a replaceable tip which can be manufactured and produced in various sizes of choice.

Still another object of the present invention is to provide a spiral type auger bit having a replaceable tip which includes all of the advantages as taught within the typical prior art and eliminates their inherent drawbacks.

DETAILED DESCRIPTION OF THE DRAWINGS

Figure 1:
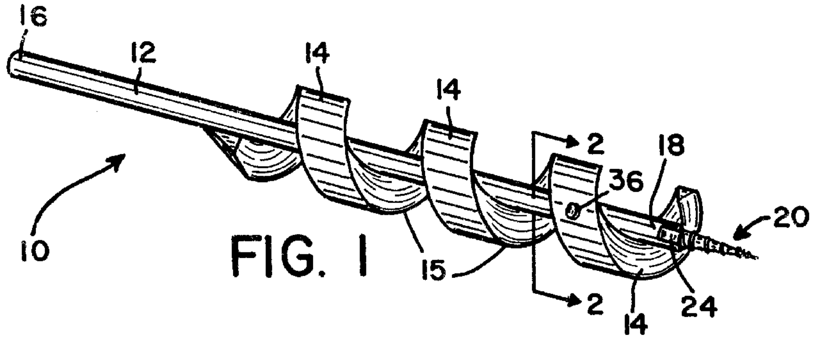
FIG. 1 is substantially a perspective view of the present invention.

Referring now to the drawings wherein like characters refer to like elements throughout the various views. In FIG. 1, arrow (10) is substantially an overview of the present invention which is substantially an auger bit having a removably attached replaceable tapered screw type biting tip. The bit (10) comprises an axially elongated shank (12) having at least one integrally formed spiral channel (14) protruding therefrom which forms a cutting edge (15) and the shank (12) having a first end (16) which is removably attachable to an auger tool and a second end (18) which is of a shape and size to removably receive a replaceable tapered screw type biting tip therein (represented by arrow 20) and removable fastener means (later described) for retaining the tip (20) within the second end (18), with the bit (10) and the replaceable tip (20) being made from any suitable material of choice, such as metal, steel, etc.

Figure 2:
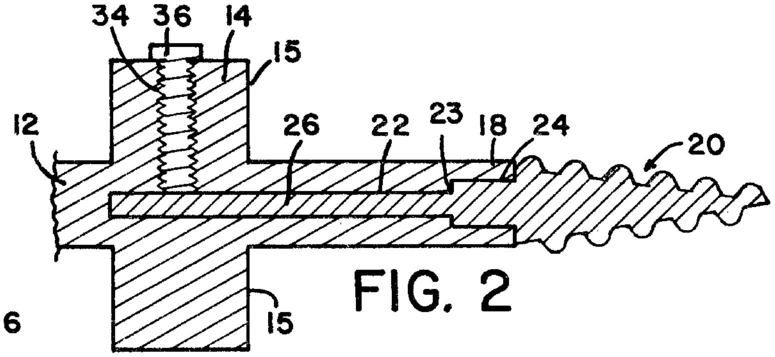
FIG. 2 is substantially a sectional view taken at 2—2 of FIG. 1.

The shank (12) of bit (10) further includes an elongated circular cavity (22) extending partially into the shank along a central axis longitudinally through the shank (12) from the second end (18) with the circular cavity (22) opening into substantially a rectangular shaped recess (24) on the second end (18), as more clearly shown within FIG. 2.

The tip (arrow 20) substantially comprises an elongated circular shaft (26) integrally attached to substantially a rectangular shaped stop means (28) which is integrally attached to a tapered screw type biting tip portion (30) (as clearly shown within FIG. 3) and the circular shaft (26) being of a shape and size to be slidably inserted within the circular cavity (22) and the stop means (28) being of a shape and size to be slidably inserted into the recess (24).

Figure 3:
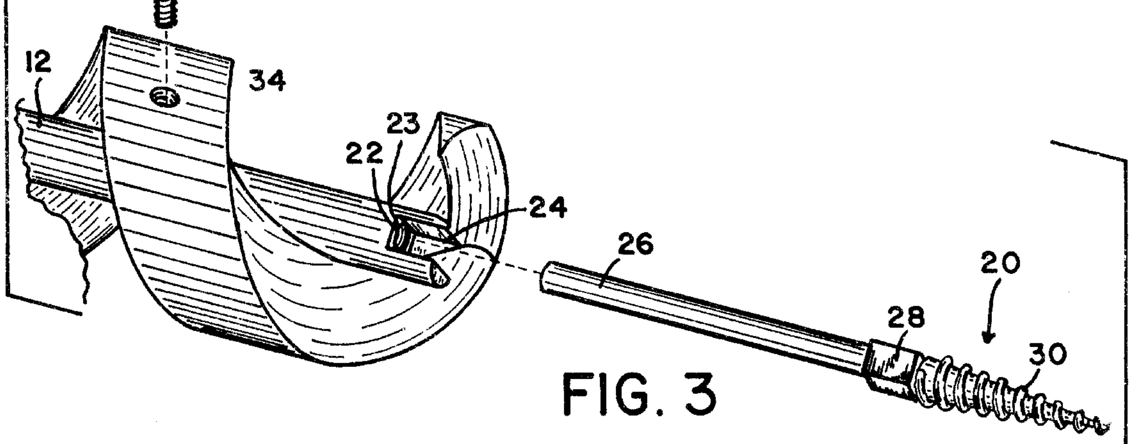
FIG. 3 is substantially a plan view for assembly of the present invention.
Figure 4:
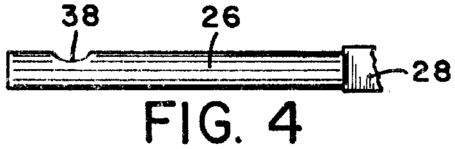
FIG. 4 is substantially a side view showing a second embodiment for the shank of the bit.
Figure 5:
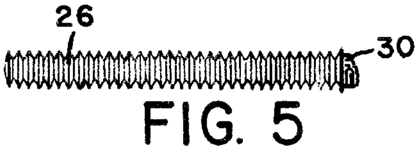
FIG. 5 is substantially a side view showing a third embodiment for the shank of the bit.

Clearly shown within FIGS. 3, 4 & 5, we provide various types of shafts (26) for the tip, (tip represented by arrow 20) thus the circular cavity (22) is of a shape and size to receive various shafts therein.

It is to be noted that if so desired, the tapered screw type biting tip portion (30) may have various biting channels of choice, such as a six channeled biting tip portion is shown within FIGS. 1 & 2, while a ten channeled biting tip portion is shown within FIG. 3.

It is to be further noted that if so desired, the elongated circular cavity (22) may be threaded and extends partially into the shank (12) along a central axis longitudinally through the shank (12) from the second end (18) and forms substantially an external circular opening (23) on the second end (18), this allows the elongated circular threaded shaft (26) of FIG. 5 (which is integrally attached to the tapered screw type biting tip 30) to be threadably removably engaged within cavity (22).

Various fastener means of engineering choice for retaining the shaft (26) of tip (20) within the circular cavity (22) may be used. For example we have shown within FIG. 2, the fastener means (which may be substantially located at a position of engineering choice upon the second end 18 of the shaft 12) being positioned within one of the channels (14). The fastener means being substantially a threaded vertical bore (34) partially through the second end (18) which is in open communication with the cavity (22) for receiving a threaded screw (36) and when the screw (36) is threadably engaged within the bore (34) the screw removably retains the shaft (26) within the cavity (22). Further fastening means may include if so desired an indent (38) (shown within FIG. 4) which is of a size and shape to partially receive the threaded end of screw (36) therein and the indent may be aligned with the stop means (28).

It will now be seen that we have herein provided an auger bit which allows the workman to replace the drill tip thereof when so desired.

It will also be seen that we have herein provided a spiral type auger bit having a tool engaging portion at one end, and the second end thereof being of a shape and size to removably receive a replaceable tip therein.

It will further be seen that we have herein provided a spiral type auger bit which removably accepts various types of drill tips of choice therein.

It will also be seen that we have herein provided a spiral type auger bit which may be sold and/or manufactured as a kit including various types of replaceable tips therewith.

Although the invention has been shown and described in what is conceived to be the most practical and preferred embodiment it is recognized that departures may be made therefrom within the scope and spirit of the invention, which is not to be limited to the details disclosed herein but is to be accorded the full scope of the claims so as to embrace any and all equivalent devices and or apparatus's.

Having described our invention, what we claim as new and desire to secure by Letters Patent is:

1. An auger bit comprising: an axially elongated shank having at least one integrally formed spiral channel protruding therefrom which forms a cutting edge, said shank having a first end which is removably attachable to an auger tool and a second end which is of a shape and size to removably receive a replaceable tip therein, said shank having an elongated circular cavity extending partially into said shank along a central axis longitudinally through said shank from said second end, and said cavity opening into substantially a rectangular shaped recess on said second end, a fastener means being substantially a threaded vertical bore partially through said second end which is in open communication with said cavity for receiving a threaded screw, said replaceable tip comprising: substantially an elongated circular shaft integrally attached to a rectangular shaped stop means which is integrally attached to a tapered screw type biting tip portion, said circular shaft being of a shape and size to be slidably inserted within said circular cavity, said stop means being of a shape and size to be slidably inserted into said recess, and said screw when threadably engaged within said bore, removably retains said shaft within said cavity.

* * * * *